Patented Jan. 27, 1953

2,626,949

UNITED STATES PATENT OFFICE 2,626,949

REACTION OF ALPHA-THIOCYANO CARBONYL COMPOUNDS WITH PRIMARY AMINES AND THEIR ACID SALTS

James T. Gregory, Akron, Ohio, assignor to The B. F. Goodrich Company, New York, N. Y., a corporation of New York No Drawing. Application October 31, 1950, Serial No. 193,281

9 Claims. (Cl. 260—306.7)

This invention relates to a novel chemical reaction between an alpha-thiocyano carbonyl compound and a primary amine or acid salt thereof and is especially concerned with the synthesis, by this reaction, of 2-imino-4-thiazolines and their acid salts, particularly certain novel compounds of this class having considerable utility for diverse purposes including their use as accelerators and activators for the vlucanization of natural and synthetic rubbers.

I have discovered that the reaction between an alpha-thiocyano carbonyl compound and a primary amine or an acid salt thereof, when carried out in an initially anhydrous medium and under conditions such that the water formed by the reaction is removed, proceeds in such a manner as to produce a 2-imino-4-thiazoline. The reaction first involves the splitting out of water between the hydroxyl group of the enol form of the alphathiocyano carbonyl and one of the hydrogen atoms of the amino group of the primary amine with formation of an unstable intermediate compound (which I refer to as a "thiocyano-anil" when the amine is aniline or similar aromatic amine, or with respect to any primary amine as a "thiocyano-amine") in which the nitrogen atom of the amino group of the amine is attached to the carbon atom originally present in the carbonyl group of the carbonyl compound. This intermediate then undergoes ring closure between the amino nitrogen and the carbon of the thiocyano group with migration of the remaining hydrogen of the amino group to the thiocyano nitrogen atom, with the result that there is formed a 2-imino-4-thiazoline containing the structure

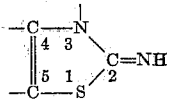

Represented structurally the reaction proceeds as follows:

(A)

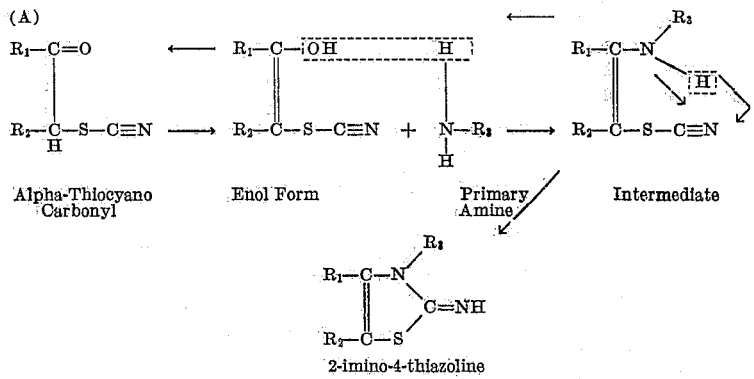

where $R_1$ and $R_2$ represent the non-reactive residue of the alpha-thiocyano carbonyl and $R_3$ represents the organic radical attached to the amino group of the primary amine. Generally $R_1$ and $R_2$ are hydrogen or hydrocarbon radicals containing from 1 to 10 carbon atoms and $R_3$ is the radical attached to the amino group of a primary monoamine containing 1 to 10 carbon atoms.

It is generally preferable in carrying out the reaction to employ an acid salt of the amine since this results in formation of the corresponding acid salt of the 2-imino-4-thiazoline which is generally insoluble in the anhydrous reaction medium and is easily recovered therefrom in excellent yield. The latter is then easily converted quantitatively to the free imino thiazoline base by neutralization. The hydrochloride of the amine is the preferred acid salt, but other hydrohalides such as the hydrobromide or hydroiodide, and still other acid salts of the amine such as those formed with sulfuric, phosphoric and other mineral acids may also be used.

When the free amine is used in the reaction the free 2-imino-4-thiazoline base which forms is difficult to isolate because of its solubility in the reaction mixture and because of the fact that it rearranges easily when heated to give the tautomeric, more-stable, 2-amino thiazole:

(B)

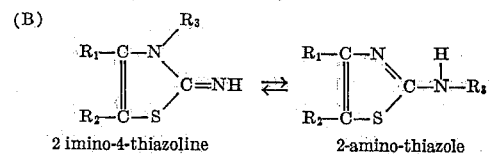

2 imino-4-thiazoline     2-amino-thiazole

Consequently, by distillation of the reaction mixture resulting from the reaction of this invention, when using a free amine, it is possible to recover a 2-amino thiazole. There is definite evidence to indicate, however, that the latter is obtained by tautomerization of the 2-imino-4-thiazoline rather than by direct reaction between the thiocyano carbonyl and the amine. If formed in the latter way, by simultaneous splitting out of water and ring closure, the addition of aqueous hydrochloric acid to the anhydrous reaction mixture immediately after removal of water should give the hydrochloride of the 2-amino thiazole. Actually this is not the case; instead the addition of aqueous acid immediately after water removal results in recovery of the hydrochloride of the original amine indicating that the unstable intermediate represented in Equation A has been split by the water and that ring closure has not yet occurred.

As mentioned hereinabove the reaction of this invention occurs when the initial reactants are substantially anhydrous and when the water formed by the reaction is removed. A convenient method of insuring that these conditions are maintained consists in forming a mixture consisting of the thiocyano carbonyl, the primary amine or its hydrochloride, and a substantially anhydrous organic diluent which forms an azeotropic mixture with water, and then refluxing the mixture with azeotropic removal of water as formed. This, of course, also affords a convenient method for following the progress of the reaction since the amount of water removed is an index of the degree to which the reaction has occurred. Suitable organic diluents which form azeotropic mixtures with water boiling in the range of 50 to 100° C., a desired temperature range for conducting the reaction, include benezene, isoamyl alcohol, n-butyl alcohol, isobutyl alcohol, sec. butyl alcohol, toluene, amyl alcohol, tert. butyl alcohol, ethyl acetate, methyl ethyl ketone, isopropyl alcohol, propyl alcohol, as well as mixtures of ethanol and carbon tetrachloride, trichloroethylene and ethanol, trichoroethylene and allyl alcohol, trichloroethylene and n-propyl alcohol, ethanol and ethyl acetate, ethanol and benzene, butanol and benzene, allyl alcohol and benzene, n-propyl alcohol and benzene, benzene and heptene, and the like.

However, it is not essential that any diluent be used since heating of the anhydrous reactants alone in an open vessel at a temperature such that the vapor pressure of water is sufficient to effect its removal, as at 50 to 100° C., results in occurrence of the reaction described.

Any enolizable alpha-thiocyano carbonyl compound may be employed as one of the reactants in this invention. Such a compound will, of course, contain in the keto form, the structure

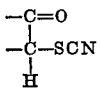

and will have only the one oxygen atom attached to the carbonyl carbon atom, that is, it will be an alpha-thiocyano aldehyde or ketone. Ordinarily it will contain, in addition to the carbonyl oxygen atom and the nitrogen and sulfur atoms of the thiocyano group, only carbon and hydrogen atoms as when it possesses the structure

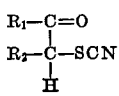

wherein $R_1$ and $R_2$ are hydrogen or hydrocarbon groups; however, $R_1$ and $R_2$ may also be radicals containing elements other than carbon and hydrogen present in non-reactive structure, as, for example, halogen replacing hydrogen in hydrocarbon groups, oxygen in ether linkages, sulfur in thioether linkages, nitrogen and oxygen in nitro groups, etc. All such alpha-thiocyano aldehydes and ketones are known types of compounds and can be readily prepared by known methods, for example, by the reaction of sodium thiocyanate with alpha-halo aldehydes and ketones.

As examples of enolizable alpha-thiocyano carbonyl compounds which are suitable reactants for the process of this invention, there may be mentioned such alpha-thiocyano-aldehydes as thiocyano-acetaldehyde, alpha-thiocyano-n-propionaldehyde, alpha - thiocyano - n - butyraldehyde, alpha - thiocyano - n - valeraldehyde, alpha-isopropyl - alpha - thiocyano - acetaldehyde, alphabenzyl - alpha - thiocyano - acetaldehyde, alphaphenyl - alpha - thiocyano - acetaldehyde, alphanaphthyl - alpha - thiocyano - acetaldehyde, alpha -cyclohexyl - alpha - thiocyano - acetaldehyde, alpha - chloro - alpha - thiocyano - acetaldehyde, alpha-thiocyano-alpha-ethoxy acetaldehyde, alpha-thiocyano-beta-chlorobutyraldehyde, and alpha-thiocyano-beta-ethoxy butyraldehyde; and such alpha-thiocyano ketones as for example 3-thiocyano-propanone-2; 3-thiocyanobutanone-2; 3-thiocyano-pentanone-2; 3-thiocyano-hexanone-2; 3-thiocyano-heptanone-2; 3-phenyl - 3 - thiocyano - propanone - 2; 3 - cyclohexyl - 3 - thiocyano - propanone - 2; 4 - phenyl-3-thiocyano-butanone-2; 5-phenyl-3-thiocyanopentanone-2; 6-phenyl-3-thiocyano-hexanone-2; 3-naphthyl-3-thiocyano-propanone-2; 5-p-tolyl-3-thiocyano-pentanone-2; 3 - thiocyano-4-pentanone-2,4-thiocyano-pentanone-3; 5 - thiocyano - hexanone - 4; 6 - thiocyano - hexanone-5; phenyl 1-thiocyano-ethyl ketone; 1-phenyl-3-thiocyano-butanone-2; 1-phenyl - 4 - thiocyanopentanone-3; naphthyl 1-thiocyano-ethyl ketone; 4 - thiocyano - hexanone - 3; 3-thiocyanoheptanone - 4; 2 - thiocyano - octanone - 3; phenyl - 1 - thiocyano - butyl ketone; 1 - phenyl - 3 - thiocyano-pentanone - 2; 1 - phenyl - 4 - thiocyano - hexanone - 3; naphthyl - 1 - thiocyanobutyl ketone; 5 - thiocyano - 1 - heptenone - 4; 3 - cyclohexyl - 3 - thiocyano - propanone - 2; cyclohexyl - 1 - thiocyano - ethyl ketone; cyclohexyl - 1 - thiocyano - propyl ketone; 1 - chloro - 3 - thiocyanobutanone - 2; 1 - bromo - 3 - thiocyanobutanone - 2; 1,1 - dichloro - 3 - thiocyanobutanone - 2; 1,4 - dibromo - 3 - thiocyanobutanone - 2; 1 - methoxy - 3 - thiocyanobutanone - 2; 1-(methyl-thio) - 3 - thiocyanobutanone - 2; 3 - thiocyano - 4 - isopropoxy - butanone - 2; 3 - thiocyano - 4 - (isopropyl - thio) - butanone - 2; 3 - thiocyano - 4 - ethoxy - butanone - 2; 3 - thiocyano - 4 - (ethyl - thio) - butanone - 2; 2 - thiocyano - 1 - o - nitrophenyl - butanone - 3; 3 - thiocyano - 5 - chloro - hexanone - 2; 2 - thiocyano - 1,5 - diphenyl - 6 - nitrohexanone - 3; 4 - thiocyano - 6 - butoxy - 5 - methylhexanone - 3; 4 - thiocyano - 1 - ethoxy - 5 - methylhexanone - 3; 2 - thiocyano - cyclopentanone; 2 - thiocyano - cyclohexanone; 2,5 - di(thiocyano) - 1,4 - cyclohexanedione; 2,3 - di(thiocyano) - 1,4 - cyclohexanedione; 1,5 - di(thiocyano) - 2,4 - pentanedione; 3,8 - di(thiocyano) - 4,7 - decanedione; 2 - (alpha - thiocyanoacetonyl) - cyclohexanone and 2 - (alpha - thiocyano - acetonyl) - 6 - thiocyanocyclohexanone.

Although any enolizable alpha-thiocyano carbonyl compound containing the structure hereinbefore set forth can be employed as a reactant according to the process of this invention, alphathiocyano ketones, where $R_1$ in the general formula hereinbefore appearing is a hydrocarbon group, are preferred as reactants because at present they are more readily available.

The primary amine employed as the other reactant in this invention either as such or, more preferably as noted above in the form of an acid salt, can be any of the wide variety of primary amines available to the art. Although unsubstituted primary amines (that is, amines composed exclusively of amino groups attached to hydrocarbon structure as in the case of primary amines of the structure $R_3NH_2$ where $R_3$ is hydrocarbon) are ordinarily employed because of their lower cost, it will be understood that primary amines containing heterocyclic ring structure or substituent groups such as halogen atoms, nitro groups, ether and thioether groups and other hydrogen-free non-reactive groups, as well as primary amines containing hydroxyl, mercapto, carboxyl, sulfonic acid and other hydrogen-containing substituent groups may also be used. Specific primary amines include unsubstituted primary amines (containing $NH_2$ linked to hydrocarbon) such as methyl amine, ethyl amine, n-propyl amine, isopropyl amine, n-butyl amine, isobutyl amine, sec. butyl amine, tert. butyl amine, 3-phenyl sec. butyl amine, amyl amines, hexyl amines, heptyl amines, allyl amine, 2-methyl allyl amine, 3-phenyl allyl amine (cinnamylamine), cyclohexyl amine, cyclopentyl amine, aniline, toluidines, xylidines, mesidine, bisphenyl amines, naphthyl amines, benzyl amine, phenethyl amine, and naphthylenemethyl amines as well as substituted amines such as 2-furanamine, 2-p-dioxanamine, 3-gamma-pyranylamine, 2-aminopyridine, 4-aminopyridine, 2-aminothiazole, 2-amino-alpha-methyl-4-phenyl-5-thiazole acetic acid, 2-amino-4-p-tolyl-5-thiazole acetic acid, 3-thiophenine, 4-(aminobutyl)-piperidine, 4-(aminobutyl) pyridine, 2,2-diethoxy ethylamine, 3-benzyloxy propylamine, 3-butoxy propylamine, 3-ethoxy propylamine, 3-(2-ethylhexyloxy) propylamine, 3-isopropoxy propylamine, 3-methoxy propylamine, 3-methoxyethoxy propylamine, 3-octadecyloxy propylamine, 3-propoxy propylamine, 3-isoamoxy cyclohexyl amine, 4-isoamoxy cyclohexylamine, 2,2'-dithiobisethylamine, o-amino-phenyl mercaptan, 2-amino-4-chlorophenyl mercaptan, 1,1-dichloro methyl amine, 2-chlorobutylamine, 2-chloropropylamine, 3-chloro-propylamine, alpha-bromobutylamine, beta-bromobutylamine, 3-bromocyclohexylamine, 4-bromo-cyclohexylamine, 2-iodo cyclohexylamine, monoethanolamine, 2-aminocyclohexanol, 4-aminocyclohexanol, 2-amino-4-methyl cyclohexanol, 8-amino octanol, 7-amino-3-heptanol, 2-amino-1-phenyl octanol, 5-amino-2,7-dimethyl-4-octanol, beta-amino ethyl mercaptan, o-aminobenzene sulfonic acid, 3-amino-2-hydroxy propane sulfonic acid, naphthionic acid, nitro anilines, nitro naphthylamines, 4-nitro-phenylene diamine, nitrotoluidines, glycine, anthranillic acid, amino benzoic acid, metanilic acid, ethylene diamine, phenylenediamine, 1,2-propanediamine, and 3,3'-diphenyldiamine.

Many of the 2-imino-4-thiazolines and their acid salts obtainable by the reaction of this invention are new compounds which find utility as accelerators and activators in the vulcanization of rubber and as intermediates for the synthesis of other rubber chemicals, as medicinals and medicinal intermediates, as agricultural chemicals with insecticidal, fungicidal and herbicidal properties and for various other purposes.

One class of novel 2-imino-4-thiazolines of special utility in the rubber industry are those which possess the structure

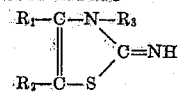

wherein $R_1$ and $R_2$ represents hydrogen or alkyl, $R_3$ represents alkyl or aryl and the total number of carbon atoms in the R groups is at least 3, and their acid salts. Compounds of this type are useful in synthesizing accelerators of vulcanization and are themselves accelerators, being particularly valuable accelerators when $R_3$ is aryl. If $R_3$ is a hydroxy, carboxy, mercapto, amino or sulfonic acid substituted alkyl or aryl radical the accelerator is modified in its activity. For example, compounds wherein $R_3$ is acidic, as in the case where it contains a carboxy or sulfonic acid group, are possessed of delayed action by reason of the acidic group whereas compounds wherein $R_3$ contains an amino or mercapto group possess their own activating group and are consequently faster in their activity.

The following specific examples will more fully describe the method of preparing the 2-imino-3-substituted-4-thiazoline compounds of this invention. Throughout the examples the term "parts" is employed to indicate parts by weight.

EXAMPLE I 25.8 parts of a mixture of thiocyano butanones prepared by the reaction of sodium thiocyanate with a mixture containing 3-chloro-butanone-2 and 1-chloro-butanone-2 resulting from the chlorination of one mole of methyl ethyl ketone with one mole of chlorine, containing 85% by weight of 3-thiocyano-butanone-2 and 15% by weight of 1-thiocyano-butanone-2 were added to a benzene solution containing 26 parts of aniline hydrochloride and 87 parts of benzene in a reactor fitted with a stirrer, an esterification head and a thermometer for measuring the temperature in the reaction zone. This mixture was stirred and heated to about 80° C. The reacting mixture was maintained at 80° C. until 3.6 parts of water had been azeotropically removed, about 3 hours. When no further water-benzene azeotropic mixture appeared in the reflux, the mixture resulting from this reaction was cooled to 20° C., withdrawn from the reactor and filtered to recover the precipitate formed during the reaction. The precipitated product was washed once with benzene, twice with acetone, and then dried. In this manner 46.1 parts, a 96% yield, of a solid material melting at 220° to 225° C. were recovered. This mixture contained 39.2 parts, 85%, 2-imino-3-phenyl-4,5-dimethyl-4-thiazoline hydrochloride and 6.9 parts, 15%, 2-imino-3-phenyl-4-ethyl-4-thiazoline hydrochloride.

EXAMPLE II

A solution containing 26 parts of aniline hydrochloride dissolved in 79 parts of benzene and 8 parts of n-butanol, and 25.8 parts of the mixture of thiocyano butanones described in Example I were placed in a reactor of the type used in Example I. This mixture was heated at 80° C. until 3.6 parts of water had been azeotropically removed from the reaction. The resulting mixture was cooled to room temperature, removed from the reactor and filtered to recover the precipitate which had formed during the reaction. This precipitate was washed once with benzene, twice with acetone and then dried. In this manner there was obtained 37.1 parts of a mixture of 2-imino-3-phenyl-4-thiazoline hydrochloride compounds consisting of 85% 2-imino-3-phenyl-4,5-dimethyl-4-thiazoline hydrochloride and 15% 2-imino-3-phenyl-4-ethyl-4-thiazoline hydrochloride. The mixture had a melting point of 220° C. to 225° C.

EXAMPLE III

There were reacted 26 parts of aniline hydrochloride and 25.8 parts of the mixture of thiocyanobutanones described in Example I in the presence of 44 parts benzene and 34 parts of heptane as a reaction diluent at about 90° C. until 3.6 parts of water were azeotropically removed. The resulting mixture was cooled to room temperature and filtered to recover the precipitate which formed during the reaction. The precipitate was washed once with benzene and twice with acetone and then dried. In this manner 43.7 parts of a mixture of 2-imino-3-phenyl-4-thiazoline hydrochlorides containing 85% 2-imino-3-phenyl-4,5-dimethyl-4-thiazoline hydrochloride and 15% 2-imino-3-phenyl-4-ethyl-4-thiazoline hydrochloride, were obtained.

EXAMPLE IV

There was reacted in the presence of 79 parts of benzene and 8 parts of n-butanol at 80° C., 26 parts of aniline hydrochloride and 25.8 parts of 3-thiocyano-butanone-2 until 3.6 parts of water were azeotropically removed. The resulting mixture was cooled to room temperature and filtered to recover the precipitate which had formed during the reaction. This precipitate was washed once with benzene and twice with acetone and then dried. In this manner 41 parts, an 80% yield, of this precipitate were recovered. This material had a melting point of 225° to 243° C. A sample of this product was purified by recrystallizing from ethanol. The purified material had a melting point of 239° C. to 241° C. A sample of the purified material was analyzed for its chemical composition and was found to contain:

| Composition by Analysis, Percent | Calculated Composition for $C_{11}H_{13}N_2SCl$, Percent |
|---|---|
| C, 54.90 | C, 55.00 |
| H, 5.46 | H, 5.40 |
| N, 11.64 | N, 11.60 |
| S, 13.29 | S, 13.30 |
| Cl, 14.77 | Cl, 14.70 |

The chemical analysis is in agreement with the calculated composition for a compound having the molecular formula of $C_{11}H_{13}N_2SCl$. A portion of the compound prepared in this example was neutralized with aqueous sodium hydroxide which precipitated an aqueous insoluble material, the free base of the compound prepared in this example. This free base together with other compounds of the same empirical formula such as 2-anilino-4,5-dimethylthiazole, 2-thiono-3-phenyl-4,5-dimethyl thiazoline, 2-amino-4,5-dimethylthiazole, and 2-mercapto-4,5-dimethyl thiazole were subjected to ultra-violet analysis. The absorption curves for these other compounds were distinctly different from that of the free base of the compound prepared above, although certain similarities were noted. For example, the absorption peaks of 2-mercapto-4,5-dimethyl thiazole and 2-thiono-3-phenyl-4,5-dimethylthiazoline occurred at the same wave lengths whereas 2-amino-4,5-dimethylthiazole and the free base prepared above had absorption peaks at the same wave lengths. 2-thiono-3-phenyl-4,5-dimethylthiazoline and this free base both had lower maximum absorption peaks which in the case of the 2-thionothiazoline was due to the presence of the phenyl group in the 3 position. But the curves of the free base and 2-anilino-4,5-dimethylthiazole had no points of similarity.

The ultra-violet analysis is convincing proof that the compounds prepared in this example were 2-imino-3-phenyl-4,5-dimethyl-4-thiazoline hydrochloride and its free base which is 2-imino-3-phenyl-4,5-dimethyl-4-thiazoline. The free base, 2-imino-3-phenyl-4,5-dimethyl-4-thiazoline, is a crystalline solid whose melting point is 52° to 53° C. The ultra-violet absorption spectra of the compound shows an absorption peak of 261 λ at Emax of 33.5.

EXAMPLE V 26 parts of 3-thiocyano-butanone-2 and 25.8 parts of aniline hydrochloride were heated together at 95° C. for 4 hours in a reactor open to the atmosphere. A solid product was formed. This product was dissolved in a mixture of benzene and ether, the ether was driven off and a solid crystalline material precipitated which was dried. In this manner 24 parts of 2-imino-3-phenyl-4,5-dimethyl-4-thiazoline hydrochloride having a melting point of 239° to 242° C. were obtained.

The following example illustrates the reaction of a thiocyano carbonyl compound of the class hereinbefore described, with a free primary amine in such a manner that a 2-amino-thiazole is recovered by distillation of the resulting reaction mixture, the aminothiazole resulting from tautomerization by the heat used in distillation of the intermediate 2-imino-4-thiazoline.

EXAMPLE VI

One mole (93 parts) of aniline, 2.8 parts of aniline hydrochloride, one-half mole (64.5 parts) of 3-thiocyano-butanone, and 175 parts of benzene were added to a reactor of the type hereinbefore employed. This mixture was heated to about 80° C. for 3 hours until all the water formed during the reaction, 8.5 parts, was azeotropically removed with the benzene. The excess benzene and unreacted aniline were then removed by distillation at a reduced pressure produced by a water aspirator. The remaining residue was distilled at a pressure of 0.1 to 0.4 mm. Hg absolute. 72 parts of a white crystalline product melting at 101 to 105° C. were thus recovered by distillation and the residue was a resinous tar. The white crystalline product recovered by distillation was purified by first recrystallizing from a mixture of ethanol and benzene and then from ethanol. The purified product was a colorless crystalline material having a diamond shape and melting at 107 to 109.5° C. By ultra-violet absorption data this material was identified as 2-anilino-4,5-dimethylthiazole. The following chemical analysis for the purified compound agrees with that calculated for 2-anilino-4,5-dimethylthiazole.

*Chemical Analysis*

| Percent composition for the above prepared products | Percent composition calculated for 2-anilino-4,5-dimethylthiazole |
|---|---|
| C, 64.64 | C, 64.67 |
| H, 5.91 | H, 5.92 |
| N, 13.67 | N, 13.71 |
| S, 15.71 | S, 15.69 |

EXAMPLES VII TO XIII

In the above Examples I to V, the reactants were employed in substantially the same proportions. Also the reaction temperature employed was 80° C. where the reaction was carried out in the presence of an azeotropic solvent. These reaction conditions are not at all critical, for the proportions of the reactants and the reaction temperature can be varied with substantially equivalent results. The following tabulated examples will further illustrate how the process of this invention can be modified.

*Table I*

| Example No. | Parts of Reactants Employed | | Reaction Conditions | | | | Yield of 2-Imino-3-Phenyl-4,5-Dimethyl-4-Thiazoline Hydrochloride, Percent |
|---|---|---|---|---|---|---|---|
| | Aniline Hydrochloride | 3-Thiocyano-Butanone-2 | Azeotropic Solvent | Reaction Time, Hrs. | Temperature, 0° | Water Removed, parts | |
| VII | 71.2 | 6.45 | none | 2 | 90 | (1) | 20.0 |
| VIII | 77.6 | 64.5 | 175 parts benzene | 3.3 | 106 | 8.2 | 78.0 |
| IX | 64.8 | 64.5 | 175 parts benzene and 40 parts n-butanol | 4.25 | 84 | 8.8 | 78.2 |
| X | 64.8 | 64.5 | ....do.... | 5.15 | 85 | 8.6 | 83.7 |
| XI | 66 | 64.5 | 194 parts benzene and 20 parts n-butanol | 3.0 | 82 | 8.4 | 89.5 |
| XII | 131 | 129 | 345 parts benzene and 80 parts n-butanol | 3.25 | 85 | 18.4 | 75.0 |
| XIII | 131 | 129 | 390 parts benzene and 40 parts n-butanol | 4.0 | 81 | 18 | 81.6 |

¹ Not measured.

The following Example XIV illustrates the best practices in carrying out the process of preparing 2-imino-4-thiazoline compounds according to this invention and also illustrates a further modification of the process of this invention. Although the process is described in detail in this example employing aniline hydrochloride and a mixture of thiocyano butanones (85% 3-thiocyano-butanone-2 and 15% 1-thiocyano butanone-2) as reactants, the conditions and process steps described are applicable for any combination of reactants and, in general, will produce the best results.

EXAMPLE XIV

A mixture consisting of 18.1 parts of benzene, 0.67 parts of n-butanol (a ratio of 27 parts of benzene for each part of butanol), 2.87 parts of aniline hydrochloride, 2.43 parts of 3-thiocyano-butanone-2 and 0.43 parts of 1-thiocyano-butanone-2 in a reaction vessel having a heating jacket, a stirrer and an esterification head, was stirred and heated to 80° C. This temperature was maintained until 0.4 part of water was azeotropically removed, this requiring about 5.3 hours. Then the heating was discontinued and the resulting slurry was extracted with 13 parts of water. After the water extraction the benzene and water layers were separated and the benzene layer was extracted with water again. After the benzene layer had been extracted three times, equal quantities of water were employed for each extraction, the benzene was distilled and stored for further use. All three water extracts were combined and the butanol was removed by distillation as a water azeotrope. A sample of the aqueous solution remaining in the still pot was found to contain 13.83% of the alkyl 2-imino-4-thiazoline hydrochlorides which represented a total yield of 5.3 parts on a dry basis of these alkyl 2-imino-4-thiazoline hydrochlorides, a 99.5% yield. The 2-imino-4-thiazoline hydrochloride formed during this reaction were 2-imino-3-phenyl-4,5-dimethyl-4-thiazoline hydrochloride (85%) and 2-imino-3-phenyl-4-ethyl-4-thiazoline hydrochlorides (15%). A mixture of the free bases of these imino hydrochlorides can be easily recovered by neutralizing the hydrochlorides with sodium hydroxide, for the free bases are insoluble in water and can be recovered in any suitable manner.

The following Examples XV to XXVIII illustrate the use of various reactants other than those of the preceding examples with formation of corresponding different compounds.

EXAMPLE XV

Employing the procedure of Example I, there was reacted 67 parts of methylamine hydrochloride, 129 parts of 3-thiocyano-butanone-2 in the presence of a reaction diluent containing 196 parts of benzene and 20 parts of n-butanol until 18 parts of water were azeotropically removed. The resulting mixture was cooled to room temperature and filtered to recover the precipitated material which formed during the reaction. The recovered solid material was washed once with benzene and twice with acetone and then dried. In this manner 153 parts, an 86% yield, of 2-imino-3,4,5-trimethyl-4-thiazoline hydrochloride were obtained. This material after being purified by recrystallization from ethanol had a melting point of 282° to 283° C. By chemical analysis this compound was found to possess the following composition which is in agreement with the calculated chemical composition of the 2-imino-3,4,5-trimethyl-4-thiazoline hydrochloride.

*Chemical Composition*

| By Analysis, Percent | Calculated, Percent |
|---|---|
| C, 40.35 | C, 40.33 |
| H, 6.14 | H, 6.20 |
| N, 15.67 | N, 15.68 |
| S, 18.06 | S, 17.94 |
| Cl, 19.87 | Cl, 19.84 |

EXAMPLE XVI

A solution containing 64.5 parts of 3-thiocyano-butanone-2, 41 parts of ethylamine hydrochloride, 261 parts of benzene and 20 parts of n-butanol was stirred and refluxed until 9 parts of water were azeotropically removed. The resulting mixture was cooled to room temperature and filtered to recover the precipitate which formed during the reaction. In this manner 82.5 parts, an 86% yield, of dry solid material was recovered. This material had a melting point of 226° to 232° C., but, after purification by recrystallization from ethanol, the purified solid material had a melting point of 236° to 238° C. The purified product was identified as 2-imino-3-ethyl-4,5-dimethyl-4-thiazoline hydrochloride having the following chemical composition as determined by analysis which is in agreement with the chemical composition, calculated for the named compound.

*Chemical Composition*

| By Analysis, Percent | Calculated, Percent |
|---|---|
| C, 43.53 | C, 43.67 |
| H, 6.76 | H, 6.75 |
| N, 14.62 | N, 14.54 |
| S, 16.72 | S, 16.64 |
| Cl, 18.39 | Cl, 18.40 |

The compound prepared above when neutralized with a basic material such as sodium hydroxide, potassium hydroxide or calcium hydroxide forms the free base, 2-imino-3-ethyl-4,5-dimethyl-4-thiazoline.

EXAMPLE XVII 25.8 parts of 3-thiocyanobutanone-2 and 38 parts of 5-amino-salicylic acid hydrochloride were suspended in a mixture containing 183 parts of benzene and 40 parts of n-butanol and then heated for 6 hours at 78° to 80° C. while the water formed during the reaction was azeotropically removed. The resulting mixture was cooled and filtered to recover the grey crystalline material which formed during the reaction. The crystalline product was washed with a mixture of benzene and hexane and then recrystallized from ethanol to purify. In this manner 54 parts of a white crystalline material melting at 279° to 281° C. were recovered. A portion of this material was analyzed and was found to have the following chemical composition which agrees with that calculated for 2-imino-3-(3-carboxy-4-hydroxyphenyl)-4,5-dimethyl-4-thiazoline hydrochloride.

*Chemical Composition*

| By Analysis, Percent | Calculated, Percent |
|---|---|
| H, 4.41 | H, 4.36 |
| C, 48.13 | C, 47.92 |
| N, 9.33 | N, 9.32 |
| S, 10.63 | S, 10.66 |
| Cl, 11.70 | Cl, 11.78 |
| O, 15.80 (by difference) | O, 15.96 |

This analysis together with an ultra-violet spectrogram showed that the product prepared in this example was 2-imino-3-(3-carboxy-4-hydroxyphenyl)-4,5-dimethyl-4-thiazoline hydrochloride.

EXAMPLE XVIII 32.3 parts of 3-thiocyano-butanone-2 and 33.9 parts of cyclohexylamine hydrochloride were suspended in a mixture consisting of 7 parts of n-butanol and 183 parts of toluene in reaction equipment described in Example I. The suspension was heated at 106° C. for about 7 hours while about four parts of water were azeotropically removed. The slurry remaining in the reactor was cooled and filtered to recover the crystalline product formed. The crude crystalline product was taken up in hot ethanol and purified by recrystallizing. This purified product had a melting point of 243° to 245° C. A portion of the product was analyzed for chemical composition and another portion was submitted for ultra-violet spectra analysis. The chemical analysis for the above ethanol purified product together with the chemical composition calculated for 2-imino-3-cyclohexyl 4,5-dimethyl-4-thiazoline hydrochloride are given below.

*Chemical Composition*

| By Analysis, Percent | Calculated, Percent |
|---|---|
| C, 53.53 | C, 53.53 |
| H, 7.78 | H, 7.76 |
| N, 11.39 | N, 11.35 |
| S, 12.98 | S, 12.99 |
| Cl, 14.40 | Cl, 14.37 |

The close agreement between the chemical composition by analysis with that calculated together with the ultra-violet spectra analysis clearly showed that the final product obtained was 2-imino-3-cyclohexyl-4,5-dimethyl-4-thiazoline hydrochloride.

EXAMPLE XIX

To a reactor as described in Example I there was added 32.3 parts of 3-thiocyanobutanone-2, 24.4 parts of monoethanolamine hydrochloride, 183 parts of benzene and 70 parts of n-butanol. This mixture was heated at 79° C. for 20 hours while about five parts of water were azeotropically removed. The resulting slurry was cooled, filtered, dried and the crystalline product was washed with acetone. A yield of 48 parts of crude product, about 92%, was thus recovered. The crude crystals were dissolved in hot ethanol and recrystallized after concentrating by evaporation of some of the ethanol. The purified product was a white crystalline material melting at 199° to 200° C. The chemical composition of this product as determined by analysis was found to be 40.25% carbon, 6.35% hydrogen, 13.4% nitrogen, 17.02% chlorine, and 7.62% (by difference) oxygen. The chemical analysis together with the ultra-violet spectra analysis showed conclusively that the compound prepared was 2-imino-3-(beta-hydroxyethyl)-4,5-dimethyl-4-thiazoline hydrochloride.

EXAMPLE XX 3-(beta-chloroethyl)-2-imino-4,5-dimethyl-4-thiazoline hydrochloride was prepared by reacting 64.5 parts of 3-thiocyanobutanone-2 and 58 parts of beta-chloroethylamine hydrochloride in the presence of 137 parts of benzene and 32 parts of n-butanol at 80° C. until about 9 parts of water were azeotropically removed, about 5 hours. The resulting slurry was filtered, washed with benzene and acetone and dried. In this manner 112.5 parts, a 99% yield, of a crude product melting at 184° to 203° C. was recovered. The crude product after purification from ethanol was a white crystalline material melting at 207° to 211° C. Chemical analysis of this compound, in table below, and ultra-violet spectra analysis showed that desired compound was obtained.

*Percentage chemical composition*

| | |
|---|---|
| C | 36.99 |
| H | 5.22 |
| N | 12.32 |
| S | 14.12 |
| Cl | 31.25 |

EXAMPLE XXI 2-imino-3(ortho-hydroxyphenyl)-4,5-dimethyl-4-thiazoline hydrochloride was prepared by reacting 32.3 parts of 3-thiocyanobutanone-2 and 36.4 parts of o-aminophenol hydrochloride in the presence of 183 parts of benzene and 32 parts of butanol at 75° to 79° C. until 4.5 parts of water were azeotropically removed, about 2 hours. The resulting slurry was filtered, and the solid product was washed with acetone and dried. In this manner 59.2 parts, a 93% yield of the crude compound melting at 219° to 232° C. was obtained.

In the following examples, the details of the preparation for each compound has been omitted. Instead there is tabulated the reactants necessary to produce each compound.

EXAMPLES XXII TO XLIII

| Example Number | Reactants | | Product |
|---|---|---|---|
| | Amine Hydrohalide | Thiocyano Carbonyl | |
| XXII | Aniline hydrochloride | thiocyano acetaldehyde | 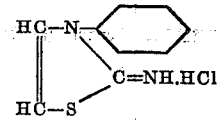 2-imino-3-phenyl-4-thiazoline hydrochloride |
| XXIII | Cyclohexyl amine hydrobromide | ...do... | 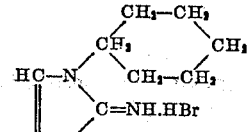 2-imino-3-cyclohexyl-4-thiazoline hydrobromide |
| XXIV | Ethylamine hydrochloride | ...do... | 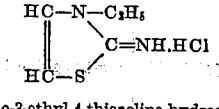 2-imino-3-ethyl-4-thiazoline hydrochloride |
| XXV | Beta-amino methylpropionate hydrochloride | 3-thiocyano-butanone-2 | 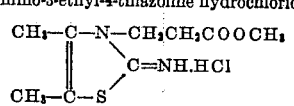 2-imino-3(beta-carbomethoxy-ethyl)-4,5-dimethyl-4-thiazoline hydrochloride m. p. 157 to 159° C. |
| XXVI | n-butylamine hydrobromide | 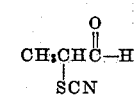 Alpha-thiocyano propionaldehyde | 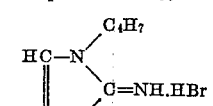 2-imino-3-n-butyl-5-methyl-4-thiazoline hydrobromide |
| XXVII | isopropylamine hydroiodide | 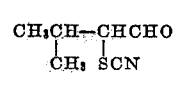 2-isopropyl-2-thiocyano acetaldehyde | 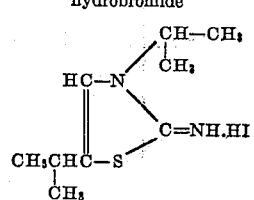 2-imino-3,5-diisopropyl-4-thiazoline hydroiodide |
| XXVIII | aniline hydrochloride | 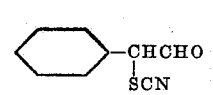 2-phenyl-2-thiocyano acetaldehyde | 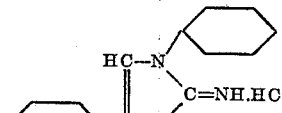 2-imino-3,5 diphenyl-4-thiazoline hydrochloride |
| XXIX | methylamine hydrochloride | 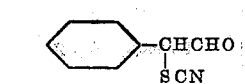 2-phenyl-2-thiocyano acetaldehyde | 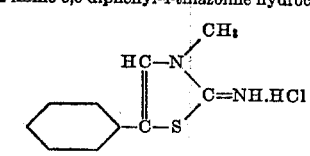 2-imino-3-methyl-5-phenyl-4-thiazoline hydrochloride |

EXAMPLES XXII TO XLIII—Continued

| Example Number | Reactants | | Product |
|---|---|---|---|
| | Amine Hydrohalide | Thiocyano Carbonyl | |
| XXX | n-butylamine hydrochloride | $C_3H_7-\underset{SCN}{CH}-\underset{O}{\overset{\parallel}{C}}-CH_3$<br><br>3-thiocyano hexanone-2 | $CH_3-C-N\overset{C_4H_9}{\diagdown}$<br>$\phantom{CH_3-C}\parallel\phantom{xxx}C=NH.HCl$<br>$C_3H_7-C-S\diagup$<br><br>2-imino-3-butyl-5-propyl-4-methyl-4-thiazoline hydrochloride |
| XXXI | benzylamine hydrochloride | ⬡$-CH_2-\underset{SCN}{CH}\overset{O}{\overset{\parallel}{C}}-CH_3$<br><br>4-phenyl-3-thiocyano-butanone-2 | $CH_3-C-N\overset{CH_2}{\diagdown}$⬡<br>$\phantom{CH_3-C}\parallel\phantom{xxx}C=NH.HCl$<br>⬡$-CH_2-C-S\diagup$<br><br>2-imino-3,5-dibenzyl-4-methyl-4-thiazoline hydrochloride |
| XXXII | ethylamine hydrochloride | $CH_3-\underset{SCN}{CH}-\underset{O}{\overset{\parallel}{C}}-C_4H_9$<br><br>6-thiocyano-heptanone-5 | $CH_3-C-N\overset{C_2H_5}{\diagdown}$<br>$\phantom{CH_3-C}\parallel\phantom{xxx}C=NH.HCl$<br>$C_4H_9-C-S\diagup$<br><br>2-imino-3-ethyl-4-methyl-5-n-butyl-4-thiazoline hydrochloride |
| XXXIII | methylamine hydrobromide | $CH_3-\underset{SCN}{CH}-\overset{O}{\overset{\parallel}{C}}-$⬡<br><br>phenyl-2-thiocyano ethyl ketone | $CH_3-C-N\overset{CH_3}{\diagdown}$<br>$\phantom{CH_3-C}\parallel\phantom{xxx}C=NH.HBr$<br>⬡$-C-S\diagup$<br><br>2-imino-3,4-dimethyl-5-phenyl-4-thiazoline hydrobromide |
| XXXIV | aniline hydroiodide | ⬡⬡$-\overset{O}{\overset{\parallel}{C}}-\underset{SCN}{CHCH_3}$<br><br>naphthyl-1-thiocyano-ethyl ketone | ⬡⬡$-C-N\diagdown$⬡<br>$\phantom{xxxxxx}\parallel\phantom{xxx}C-NH.HI$<br>$CH_3-C-S\diagup$<br><br>2-imino-3-phenyl-4-naphthyl-5-methyl-4-thiazoline hydroiodide |
| XXXV | ethylamine hydrochloride | $C_2H_5\underset{SCN}{CH}-\overset{O}{\overset{\parallel}{C}}-C_4H_9$<br><br>6-thiocyano octanone-5 | $C_4H_9-C-N\overset{C_2H_5}{\diagdown}$<br>$\phantom{C_4H_9-C}\parallel\phantom{xxx}C=NH.HCl$<br>$C_2H_5-C-S\diagup$<br><br>2-imino-3,5-diethyl-4-butyl-4-thiazoline hydrochloride |
| XXXVI | n-propylamine hydrochloride | $C_2H_5\underset{SCN}{CH}C\underset{O}{\overset{\parallel}{C}}CH_2CH_2-$⬡<br><br>1-phenyl-4-thiocyano-hexanone-3 | ⬡$-C_2H_4-C-N\overset{C_3H_7}{\diagdown}$<br>$\phantom{xxxxxxxxx}\parallel\phantom{xxx}C=NH.HCl$<br>$C_2H_5-C-S\diagup$<br><br>2-imino-3-propyl-4-phenethyl-5-ethyl-4-thiazoline hydrochloride |
| XXXVII | benzylamine hydrochloride | $C_2H_5C-\underset{SCN}{C}-\underset{O}{\overset{\parallel}{C}}-CH_2-CH=CH_2$<br><br>5-thiocyano-1-heptenone-4 | $CH_2=CH-CH_2-C-N\overset{CH_2}{\diagdown}$⬡<br>$\phantom{xxxxxxxxxxxxxx}\parallel\phantom{xxx}C=NH.HCl$<br>$C_2H_5C-S\diagup$<br><br>2-imino-3-benzyl-4-allyl-5-ethyl-4-thiazoline hydrochloride |
| XXXVIII | 2-propenylamine hydrochloride | $CH_2=CH-CH_2-\underset{SCN}{CH}\overset{O}{\overset{\parallel}{C}}-CH_3$<br><br>3-thiocyano-4-hexanone-2 | $CH_3-C-N-CH_2-CH=CH_2$<br>$\phantom{CH_3-C}\parallel\phantom{xxxxxxx}C=NH.HCl$<br>$CH_2=CH-CH_2-C-S\diagup$<br><br>2-imino-3,5-diallyl-4-methyl-4-thiazoline hydrochloride |

EXAMPLES XXII TO XLIII—Continued

| Example Number | Reactants | | Product |
|---|---|---|---|
| | Amine Hydrohalide | Thiocyano Carbonyl | |
| XXXIX | 2-furanamine hydrochloride | 3-thiocyano-butanone-2 | 2-imino-3-(2-furan)-4,5-dimethyl-4-thiazoline hydrochloride |
| XL | p-nitro aniline hydrochloride | do | 2-imino-3-(p-nitrophenyl)-4,5-dimethyl-4-thiazoline hydrochloride |
| XLI | 3-methoxy propylamine hydrochloride | do | 2-imino-3-(methoxypropyl)-4,5-dimethyl-4-thiazoline hydrochloride |
| XLII | o-amino phenyl mercaptan hydrochloride | do | 2-imino-3-(o-mercapto phenyl)-4,5-dimethyl-4-thiazoline hydrochloride |
| XLIII | o-amino benzene sulfonic acid hydrochloride | do | 2-imino-3-(o-benzene-sulfonic-acid)-4,5-dimethyl-4-thiazoline hydrochloride |

Any of the 2-imino-4-thiazoline hydrohalide products illustrated in Examples XXII to XLIII can be neutralized with a basic material such as sodium hydroxide, to the free imino base.

In all the illustrative examples an amine hydrohalide was employed as a reactant with the subsequent formation of a 2-imino-4-thiazoline hydrohalide which on neutralization yields the corresponding free base. But, as hereinbefore stated, a primary amine may be employed as a reactant with the thiocyanocarbonyl compound. Where a primary amine is employed as a reactant, it will be found that the yield of the 2-imino-4-thiazoline products will be substantially lower than that reported in the specific examples, in the nature of 20% to 40% of the theoretical yield.

As hereinbefore stated, the 2-imino-4-thiazoline compounds can be readily converted to 2-amino thiazoles. The following example illustrates the conversion of 2-imino-3-phenyl-4,5-dimethyl-4-thiazoline to 2-anilino-4,5-dimethyl-thiazole.

EXAMPLE XLIV

Twenty-four parts of 2-imino-3-phenyl-4,5-dimethyl-4-thiazoline hydrochloride prepared in Example IV were added to 110 parts of hydrochloric acid (20% HCl). This mixture was boiled for 30 hours with periodic replacement of the water evaporated and, upon cooling, there was recovered 17 parts, a 71% yield of 2-anilino-4,5-dimethylthiazole hydrochloride melting at 115° C. to 118° C. This material was added to a 5% aqueous sodium hydroxide solution and the precipitate which formed was recovered and recrystallized. This purified material had a melting point of 100.5° C. to 107.5° C. and when mixed with an authentic sample of 2-anilino-4,5-dimethylthiazole caused no depression in the melting point of the authentic amino thiazole. Hence the final product obtained by the neutralization step was 2-anilino-4,5-dimethyl-thiazole.

Other chemical uses of the 2-imino-4-thiazolines as intermediates in organic syntheses are illustrated by the following examples.

EXAMPLE XLV 2-(2,4-dinitrophenyl imino)-3-phenyl-4,5-dimethyl-4-thiazoline was prepared by reacting 2-imino-3-phenyl-4,5-dimethyl-4-thiazoline with 2,4-dinitrochlorobenzene. This reaction was carried out by adding 10.2 parts of 2-imino-3-phenyl-4,5-dimethyl-4-thiazoline hydrochloride, 2 parts of sodium hydroxide, 40 parts of ethanol, and 10.2 parts of 2,4-dinitrochlorobenzene to a reactor, the free 2-iminothiazoline being formed in situ. This mixture was heated for about 15 minutes at 70° to 75° C. A very vigorous reaction occurred giving a blood red solution with a white precipitate (NaCl), some of the reactants were lost due to the vigorous nature of the reaction. The resulting hot mixture was filtered to remove the NaCl and after cooling the ethanol solution, a red-brown precipitate formed. This precipitate was separated into two different crystalline components by repeated recrystallization from an ether-hexane mixture.

One product was a light yellow crystalline material having a melting point of 85° to 85.5° C. after chromatigraphic purification. Chemical analysis showed that this material contained no sulfur but had .81% hydrogen, 45.42% carbon, 13.28% nitrogen, and 37.49% oxygen (by difference). The chemical composition agrees with that calculated for 2,4-dinitrophenetole (the product of the reaction of ethanol with the dinitrobenzene chloride) which has a melting point of 85° C. as reported in the literature.

The second component isolated was a bright red crystalline solid and had a melting point of 171.5° to 174° C. The chemical composition of this solid material was found by analysis to be 3.83% H, 55.25% C, 15.17% N, 8.57% S, and 17.18% O (by difference). The chemical analysis and the red color which is characteristic for compounds containing the structure

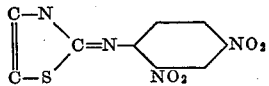

establishes that the red component isolated was the desired product.

EXAMPLE XLVI 12 parts of 2-imino-3-phenyl-4,5-dimethyl-4-thiazoline hydrochloride were dissolved in 63 parts of glacial acetic acid. To this solution there was slowly added 4.5 parts of sodium nitrite dissolved in 20 parts of water over a period of about 30 minutes while maintaining the reaction at about 25° C. Orange crystals precipitated from the reaction mixture. The resulting mixture was poured into twice its volume of ice and, after the ice had melted, the solid product was recovered by filtration and then dried. There was recovered 10.9 parts of the desired product, a 95% yield, which had a melting point of 149.5° to 150.5° C. This product was 2-(N-nitrosoimino)-3-phenyl-4,5-dimethyl-4-thiazoline.

EXAMPLE XLVII

Benzoyl chloride when reacted with 2-imino-3-phenyl-4,5-dimethyl-4-thiazoline (formed in situ by neutralizing its hydrochloride with sodium hydroxide) in the Schotten-Bauman reaction gave a high yield of a white crystalline material having a melting point of 172–174.5° C. This material was found to be 2-(benzoyl imino)-3-phenyl-4,5-dimethyl-4-thiazoline.

Another property of the 2-imino thiazoline-4 compounds hereinbefore disclosed was the ability of these compounds to accelerate the vulcanization of rubbery materials. The following example illustrates this property.

EXAMPLE XLVIII

There was thoroughly mixed together 100 parts of a rubbery material obtained from the copolymerization of butadiene-1,3 with styrene in an aqueous medium containing a salt of disproportionated abietic acid (known as a rosin soap) as the emulsifying agent, said rubbery material being known as GR–S–10; 40 parts of carbon black; 1.5 parts of stearic acid; 2.0 parts of sulfur; and 2.2 parts of 2-imino-3-phenyl-4,5-dimethyl-4-thiazoline. Portions of this mixture were heated in a press at 300° F. for varying periods of time, after which stress-strain tests were made on the vulcanizates so prepared. In the following table are the physical properties so obtained.

*Synthetic rubber—Vulcanized at 300° F.*

| Time, Min. | 300% Modulus lbs. per sq. in. | Ultimate Tensile Strength, lbs. per sq. in. | Percent Elongation at Break |
|---|---|---|---|
| 10 | (1) | 200 | 952 |
| 20 | 225 | 1,225 | 925 |
| 40 | 450 | 3,075 | 765 |
| 60 | 725 | 3,625 | 715 |
| 80 | 1,000 | 3,650 | 685 |

1 Too low to measure.

EXAMPLE XLIX

There were thoroughly mixed together 100 parts of natural crude rubber, 50 parts of carbon black, 5.0 parts of zinc oxide, 3.0 parts of stearic acid, 1.0 part of phenyl-beta-naphthylamine, 3.0 parts of sulfur, and 1.0 part of 2-imino-3-phenyl-4,5-dimethyl-4-thiazoline. Portions of this mixture were heated in a press at 280° F. for varying periods of time. The data obtained from stress-strain tests made on the resulting vulcanizates are tabulated below:

*Vulcanization of natural crude rubber at 280° F.*

| Time, Min. | 300% Modulus, lbs. per sq. in. | Ultimate Tensile Strength, lbs. per sq. in. | Percent Elongation at Break |
|---|---|---|---|
| 5 | 25 | 500 | 940 |
| 10 | 150 | 975 | 780 |
| 20 | 275 | 2,250 | 775 |
| 40 | 1,125 | 4,350 | 635 |
| 80 | 1,450 | 4,825 | 620 |

EXAMPLE L

There were thoroughly mixed together 100 parts of natural crude rubber, 50 parts of carbon black, 5.0 parts of zinc oxide, 3.0 parts of stearic acid, 1.0 part of phenyl-beta-naphthylamine, 3.0 parts of sulfur and 1.0 part of 2-imino-3-phenyl-4,5-dimethyl-4-thiazoline. To portions of this composition there was added various mercapto compounds to determine what mercapto compounds activate the accelerating properties of the 2-imino-4-thiazoline compounds. The activation of the above 2-imino-4-thiazoline compound was determined by a Mooney viscometer at 250° F. with the small (1 3/16 inch) rotor and the results of these tests are tabulated below where scorch time is the time in minutes for the sample to reach a minimum viscosity plus the time for an increase of three viscosity units above the minimum value, cure time is the time in minutes for an increase of 33 viscosity units above minimum viscosity and cure rate is the difference in time between the time values for scorch time and cure time.

*Activation of 2-imino-4-thiazoline accelerators*

| Mercapto Activator | Parts per 100 parts of rubber | Scorch Time | Cure Time | Cure Rate |
|---|---|---|---|---|
| None | | 4.7 | 8.4 | 3.7 |
| Dodecyl mercaptan | 0.2 | 5.9 | 10.2 | 4.3 |
| Do | 0.4 | 7.0 | 12.1 | 5.1 |
| Beta-mercapto propionic acid | 0.2 | 5.5 | 9.7 | 4.2 |
| 3-Mercapto Benzoic Acid | 0.2 | 4.7 | 8.2 | 3.5 |
| 2-Mercapto-4,6,6-Trimethyl thiazine | 0.2 | 4.3 | 7.0 | 3.7 |
| 2-Mercapto-benzothiazole | 0.2 | 2.7 | 4.1 | 1.4 |
| 2-Mercapto-4,6,6-Trimethyl thiazine [1] | 0.2 | 7.0 | 17.0 | 10.0 |
| 2-Mercaptobenzothiazole [1] | 0.2 | 6.7 | 10.5 | 3.8 |

[1] Same vulcanizable composition but no 2-imino-4-thiazoline.

The significance of the above data is as follows: The scorch time values indicate whether or not undesirable prevulcanization will occur during mixing and processing of the rubber composition prior to vulcanization, i. e., if the scorch time is below 5 there is a great possibility of scorch or prevulcanization. The scorch time also indicates delayed action acceleration, i. e., where the scorch time is 10 to 15, the accelerating materials are said to be delayed action accelerators. The cure rate indicates whether or not the composition will vulcanize rapidly or slowly to a desired optimum and a cure rate of from 2 to 5 is desirable.

EXAMPLE LI 2-imino-3-phenyl-4,5-dimethyl-4-thiazoline hydrochloride and 2-mercapto benzothiazole each were added as accelerators to a natural crude rubber composition consisting of 100 parts of natural crude rubber, 50 parts of carbon black, 5.0 parts of zinc oxide, 3.0 parts of sulfur, 3.0 parts of stearic acid, and one part of phenyl-beta-naphthylamine. The following data were obtained by a Mooney viscometer at 250° F. using the small rotor.

| Accelerator | Comparative Accelerating Ability of 2-imino-4-Thiazoline Compounds | | Cure Rate, Min. |
|---|---|---|---|
| | Parts per 100 parts Rubber | Scorch Time, Min. | |
| 2-Imino-3-phenyl-4,5-dimethyl-4-thiazoline hydrochloride | 1.0 | 6.0 | 4.3 |
| 2-Mercapto-benzothiazole | 0.5 | 9.5 | 3.4 |

EXAMPLE LII 2-mercaptothiazole salt of 2-imino-3-phenyl-4,5-dimethyl thiazole and 2-mercapto-4,5-dimethyl thiazole (a white crystalline material having a melting point of 93° to 107° C.) was incorporated into a natural crude rubber composition containing 100 parts of the rubber, 50 parts of carbon black, 3 parts of sulfur, 5 parts of zinc oxide, 3 parts of stearic acid and 1 part of phenyl-beta-naphthylamine. Zinc dimethyl dithiocarbamate (Zimate) 2-mercaptobenzothiazole (Captax) and N-cyclohexyl-2-benzothiazole sulfenamide (Santocure) was incorporated into a similar natural crude rubber composition for purposes of comparison. The following Mooney viscometer data indicates the accelerating properties of the thiazole-2-imino-4-thiazoline salt.

| Accelerator | Parts per 100 parts of Rubber | Scorch Time | Cure Rate |
|---|---|---|---|
| Thiazole-Imino-4-Thiazoline | 0.5 | 5.0 | 2.0 |
| Zimate | 0.2 | 4.6 | 0.9 |
| Captax | 0.5 | 9.2 | 2.7 |
| Santocure | 0.5 | 13.4 | 5.4 |

From the above it can be seen that the thiazole-imino-4-thiazoline salt would bring about a quite rapid vulcanization and might even cause prevulcanization but not to the same degree as would the zinc dithiocarbamate. Rather the thiazole-imino-4-thiazoline salt would be as fast an accelerator as Captax.

Although I have illustrated my invention by means of specific examples, I do not thereby desire or intend to limit myself solely thereto, for as hitherto stated other equivalent chemical compounds can be employed as reactants to prepare other specific members of the class of 2-imino-4-thiazoline compounds herein disclosed and the precise proportions of reactants also may be varied, if desired, without departing from the spirit and scope of this invention as defined in the appended claims.

I claim:

1. The method which comprises preparing a substantially anhydrous reaction mixture containing, as reactants, an enolizable alpha-thiocyano carbonyl compound and a primary amino compound selected from the class consisting of primary amines and the acid salts thereof, heating the said mixture thereby to effect a chemical reaction involving the splitting out of water from the hydroxyl group of the enol form of the carbonyl compound and one of the hydrogen atoms of the amino group of the amino compound with formation of an intermediate compound in which the nitrogen atom of said amino group is attached to the carbon atom originally present in the carbonyl group of the carbonyl compound, and removing the water of reaction while continuing to heat the reaction mixture whereupon the said intermediate undergoes ring closure by formation of a bond between the said nitrogen atom and the carbon atom of the thiocyano group, with migration of the remaining hydrogen of the amino group to the thiocyano nitrogen atom, to produce a 4-thiazoline ring to which an imino radical is attached in the 2-position.

2. The method which comprises preparing a substantially anhydrous reaction mixture containing, as reactants, an enolizable alpha-thiocyano ketone and an acid salt of a primary amine, heating the said mixture thereby to effect a chemical reaction involving the splitting out of water from the hydroxyl group of the enol form of the ketone and one of the hydrogen atoms of the amino group of the amine with formation of an intermediate compound in which the nitrogen atom of said amino group is attached to the carbon atom originally present in the keto group of the ketone, and removing the water of reaction while continuing to heat the reaction mixture whereupon the said intermediate undergoes ring closure by formation of a bond between the said nitrogen atom and the carbon atom of the thiocyano group, with migration of the remaining hydrogen of the amino group to the thiocyano nitrogen atom, to produce an acid salt of a 2-imino-4-thiazoline.

3. The method which comprises preparing a reaction mixture containing, as reactants, an enolizable alpha-thiocyano carbonyl compound and a primary amine hydrohalide, and an organic reaction diluent which forms an azeotropic mixture with water, and refluxing the said mixture to effect chemical reaction between the said reactants while azeotropically removing the water of reaction thereby to form, as reaction product, a hydrohalide of a 2-imino-4-thiazoline.

4. The method of claim 3 further characterized in that the hydrohalide of a 2-imino-4-thiazoline formed as the reaction product is recovered and neutralized to form the free base.

5. The method of claim 3 further characterized in that the primary amine hydrohalide is the hydrochloride of a primary amine of the structure $R_3$—$NH_2$ wherein $R_3$ is a hydrocarbon radical, the reaction product being the hydrochloride of a 2-imino-4-thiazoline in which the hydrocarbon radical $R_3$ is attached in the 3-position.

6. The method of claim 5 further characterized in that the alpha-thiocyano carbonyl compound is an alpha-thiocyano ketone of the structure

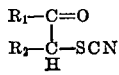

wherein $R_1$ and $R_2$ are hydrocarbon radicals, the reaction product being the hydrochloride of a 2-imino-4-thiazoline of the structure

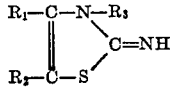

wherein each of $R_1$, $R_2$ and $R_3$ is a hydrocarbon radical.

7. The method of claim 6 further characterized in that the primary amine hydrochloride is aniline hydrochloride and the thiocyano ketone is an alpha thiocyano butanone.

8. The method of claim 6 further characterized in that the primary amine hydrochloride is an alkyl amine hydrochloride and the thiocyano ketone is an alpha thiocyano butanone.

9. The method which comprises preparing a reaction mixture containing, as reactants, aniline hydrochloride and 3-thiocyano-butanone-2, and as the reaction diluent a mixture containing benzene and butanol, refluxing said reaction mixture to effect chemical reaction between said reactants while azeotropically removing all of the water of reaction, extracting the resulting benzene slurry with water, and azeotropically distilling off the butanol, the reaction product 2-imino-3-phenyl-4, 5-dimethyl-4-thiazoline hydrochloride being obtained in an aqueous solution.

JAMES T. GREGORY.

REFERENCES CITED

The following references are of record in the file of this patent:

FOREIGN PATENTS

| Number | Country | Date |
|---|---|---|
| 238,594 | Switzerland | Nov. 16, 1945 |

OTHER REFERENCES

Chemical Abst., vol. 36, p. 5171 citing Drucy, Helvitica Chim. Acta, vol. 24 (Supplement), pp. 226-33E (1941).